United States Patent
Ko

(10) Patent No.: US 11,334,273 B1
(45) Date of Patent: May 17, 2022

(54) VALID DATA MERGING METHOD, MEMORY STORAGE DEVICE AND MEMORY CONTROL CIRCUIT UNIT

(71) Applicant: PHISON ELECTRONICS CORP., Miaoli (TW)

(72) Inventor: Bo-Cheng Ko, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/207,749

(22) Filed: Mar. 22, 2021

(30) Foreign Application Priority Data

Feb. 17, 2021 (TW) ................... 110105240

(51) Int. Cl.
  *G06F 3/06* (2006.01)

(52) U.S. Cl.
  CPC .......... *G06F 3/0647* (2013.01); *G06F 3/0604* (2013.01); *G06F 3/0652* (2013.01); *G06F 3/0679* (2013.01)

(58) Field of Classification Search
  CPC .... G06F 3/0647; G06F 3/0604; G06F 3/0652; G06F 3/0679
  See application file for complete search history.

(56) References Cited

U.S. PATENT DOCUMENTS

| | | | | |
|---|---|---|---|---|
| 7,610,437 B2 * | 10/2009 | Sinclair | ................. | G06F 3/0652 711/104 |
| 7,984,084 B2 * | 7/2011 | Sinclair | ............... | G06F 16/1847 707/818 |
| 8,285,918 B2 * | 10/2012 | Maheshwari | ....... | G06F 12/0891 711/159 |
| 8,443,263 B2 * | 5/2013 | Selinger | .............. | G06F 11/1068 714/768 |
| 8,873,284 B2 * | 10/2014 | Sinclair | ............... | G06F 12/0246 365/185.11 |
| 9,223,693 B2 * | 12/2015 | Sinclair | ............... | G06F 12/0246 |
| 9,336,133 B2 * | 5/2016 | Sinclair | ............... | G06F 12/0246 |
| 9,348,746 B2 * | 5/2016 | Sinclair | ............... | G06F 12/0246 |
| 9,361,040 B1 * | 6/2016 | Wei | ....................... | G06F 3/0608 |
| 9,465,731 B2 * | 10/2016 | Sinclair | ................. | G06F 3/0688 |
| 9,734,050 B2 * | 8/2017 | Sinclair | ............... | G06F 12/0253 |
| 9,734,911 B2 * | 8/2017 | Sinclair | ................. | G06F 3/0658 |
| 9,778,855 B2 * | 10/2017 | Sinclair | .................. | G06F 3/064 |
| 9,983,805 B1 * | 5/2018 | Chen | ....................... | G06F 3/061 |
| 10,120,613 B2 * | 11/2018 | Sinclair | .................. | G06F 12/02 |
| 10,133,490 B2 * | 11/2018 | Sinclair | ................. | G06F 3/0655 |

(Continued)

*Primary Examiner* — Christopher D Birkhimer
(74) *Attorney, Agent, or Firm* — JCIPRNET

(57) ABSTRACT

A valid data merging method, a memory storage device and a memory control circuit unit are provided. The method includes: collecting a first valid data in a source unit according to a first logical-to-physical address mapping table recorded in a candidate information, and determining whether a first data amount of the first valid data is same as a second data amount of a valid data corresponding to a valid count of the source unit; in response to determining that they are the same, copying the first valid data to a target unit; and in response to determining that they are not the same, obtaining one or more second logical-to-physical address mapping table according to a management information of the source unit to collect a second valid data in the source unit, and copying the second valid data to the target unit.

24 Claims, 13 Drawing Sheets

(56) References Cited

U.S. PATENT DOCUMENTS

| | | | | |
|---|---|---|---|---|
| 10,430,279 | B1* | 10/2019 | Dittia | G06F 3/0656 |
| 10,983,715 | B2* | 4/2021 | Sharoni | G06Q 20/105 |
| 11,086,772 | B2* | 8/2021 | Jin | G06F 12/0246 |
| 2007/0033325 | A1* | 2/2007 | Sinclair | G06F 3/0608 |
| | | | | 711/170 |
| 2008/0082596 | A1* | 4/2008 | Gorobets | G06F 12/0253 |
| 2008/0189477 | A1* | 8/2008 | Asano | G06F 12/0246 |
| | | | | 711/E12.008 |
| 2011/0145473 | A1* | 6/2011 | Maheshwari | G06F 12/0873 |
| | | | | 711/E12.008 |
| 2011/0161784 | A1* | 6/2011 | Selinger | G06F 11/1016 |
| | | | | 714/E11.002 |
| 2014/0325148 | A1* | 10/2014 | Choi | G06F 3/0659 |
| | | | | 711/114 |
| 2014/0365719 | A1* | 12/2014 | Kuzmin | G06F 12/0246 |
| | | | | 711/103 |
| 2016/0246713 | A1* | 8/2016 | Choi | G06F 3/0608 |
| 2017/0083436 | A1* | 3/2017 | Jung | G06F 12/0246 |
| 2017/0123655 | A1* | 5/2017 | Sinclair | G06F 3/061 |
| 2018/0225176 | A1* | 8/2018 | Kim | G06F 13/1668 |
| 2020/0089420 | A1* | 3/2020 | Sharoni | G06F 21/79 |
| 2020/0301851 | A1* | 9/2020 | Kuo | G06F 12/0246 |
| 2020/0334139 | A1* | 10/2020 | Hwang | G06F 11/076 |
| 2020/0349065 | A1* | 11/2020 | Ke | G06F 13/1668 |
| 2020/0393989 | A1* | 12/2020 | Yeh | G06F 3/064 |

* cited by examiner

| Physical erasing unit | Valid count |
|---|---|
| 610(0) | 4 |
| 610(1) | 4 |
| 610(2) | 2 |
| .... | .... |

| PTE | PTE(0) | PTE(1) | PTE(2) | PTE(3) | PTE(4) | PTE(5) | PTE(6) | PTE(7) |
|---|---|---|---|---|---|---|---|---|
| identification information | 0 | 0 | 0 | 0 | 0 | 0 | 0 | 1 |

FIG. 9

| PTE | PTE(0) | PTE(1) | PTE(2) | PTE(3) | PTE(4) | PTE(5) | PTE(6) | PTE(7) |
|---|---|---|---|---|---|---|---|---|
| identification information | 0 | 0 | 0 | 0 | 0 | 0 | 0 | 1 |

FIG. 10

| PTE | PTE(0) | PTE(1) | PTE(2) | PTE(3) | PTE(4) | PTE(5) | PTE(6) | PTE(7) |
|---|---|---|---|---|---|---|---|---|
| identification information | 1 | 1 | 0 | 1 | 1 | 1 | 1 | 1 |

VALID DATA MERGING METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 110105240, filed on Feb. 17, 2021. The entirety of the above-mentioned patent application is hereby incorporated by reference herein and made a part of this specification.

BACKGROUND

Technical Field

The disclosure relates to a memory management technology, and particularly relates to a valid data merging method, a memory storage device using this method and a memory control circuit unit.

Description of Related Art

Digital cameras, mobile phones, and MP3 players have been developed rapidly over the past few years, resulting in a rapid increase in consumer demand for storage media. As the rewritable non-volatile memory module (for example, flash memory) has the characteristics of non-volatile data, power saving, small size, and no mechanical structure, it is very suitable for internal built in the various portable multimedia devices mentioned above.

Generally speaking, a rewritable non-volatile memory module typically includes a plurality of physical erasing units, and each physical erasing unit includes a plurality of physical programming units. The memory management circuit in the memory storage device allocates logical addresses to map the physical erasing unit, wherein each logical unit has a plurality of logical addresses to map the corresponding physical erasing unit.

In order to identify which physical erasing unit that the data of each logical address is stored in, the memory management circuit records the mapping between the logical address and the physical erasing unit. Specifically, the memory management circuit stores a plurality of logical-to-physical address mapping tables in the rewritable non-volatile memory module to record the physical erasing unit mapped to each logical address. When data is to be accessed, the memory management circuit loads the corresponding logical-to-physical address mapping table, and writes or reads data according to the logical-to-physical address mapping table.

When the number of physical erasing units in the spare area of the memory storage device is insufficient, typically the valid data stored in the physical erasing unit in the storage area can be executed data movement through the garbage collection process and new spare physical erasing unit is released. When the garbage collection process is executed, the memory storage device needs to spend considerable amount of time to look up the logical-to-physical address mapping table for collecting the valid data in the source physical erasing unit. Based on the above, how to reduce the time for collecting valid data is one of the issues to be solved by practitioners in the field.

SUMMARY

The disclosure provides a valid data merging method, a memory storage device, and a memory control circuit unit, which can shorten the time for data merging operations and increase the system performance of the memory storage device.

An exemplary embodiment of the disclosure provides a valid data merging method for rewritable non-volatile memory modules. The rewritable non-volatile memory module includes a plurality of physical erasing units, and each of the plurality of physical erasing units includes a plurality of physical programming units. The method for merging valid data includes: collecting a first valid data in a first source unit in the plurality of physical erasing units according to a first logical-to-physical address mapping table recorded in a candidate information, and determining whether a first data amount of the first valid data is the same as a second data amount of a valid data corresponding to a valid count of the first source unit; in response to determining that the first data amount is the same as the second data amount, copying the first valid data to a target unit in the plurality of physical erasing units; and in response to determining that the first data mount is not the same as the second data amount, obtaining one or more second logical-to-physical address mapping tables according to a management information of the first source unit, and collecting a second valid data in the first source unit according to the second logical-to-physical address mapping table, and copying the second valid data to the target unit. The management information records the logical-to-physical address mapping table corresponding to the valid data stored in each of the plurality of physical erasing units.

In an exemplary embodiment of the disclosure, the method further includes: setting the candidate information, wherein the candidate information records the first logical-to-physical address mapping table.

In an exemplary embodiment of the disclosure, the step of setting the candidate information includes: selecting one or more of the plurality of physical erasing units according to the valid counts of the plurality of physical erasing units as a second source unit; obtaining the second logical-to-physical address mapping table mapping the valid data of the second source unit according to the management information of the second source unit; and selecting one of the second logical-to-physical address mapping tables as the first logical-to-physical address mapping table to establish the candidate information.

In an exemplary embodiment of the disclosure, the step of selecting one of the second logical-to-physical address mapping tables as the first logical-to-physical address mapping table to establish the candidate information includes: calculating the count value of each of the second logical-to-physical address mapping tables according to the number of times the second logical-to-physical address mapping table is obtained; and selecting, according to the count value, one of the second logical-to-physical address mapping tables as the first logical-to-physical address mapping table to establish the candidate information.

In an exemplary embodiment of the disclosure, the step of setting the candidate information includes: presetting the first logical-to-physical address mapping table recorded in the candidate information.

In an exemplary embodiment of the disclosure, after copying the second valid data to the target unit, the valid data merging method further includes: updating the candidate information according to the second logical-to-physical address mapping table recorded in the management information.

In an exemplary embodiment of the disclosure, the step of updating the candidate information according to the second logical-to-physical address mapping table recorded in the management information includes: recalculating the count value of each of the second logical-to-physical address mapping tables according to the number of times the second logical-to-physical address mapping table is obtained; and reselecting the first logical-to-physical address mapping table from the second logical-to-physical address mapping table according to the count value to update the candidate information.

In an exemplary embodiment of the disclosure, the method further includes: obtaining valid counts of the plurality of physical erasing units, wherein the valid counts of the plurality of physical erasing units reflect the amount of valid data stored in each of the plurality of physical erasing units; and selecting one or more of the plurality of physical erasing units as the first source unit according to the valid counts of the plurality of physical erasing units.

An exemplary embodiment of the disclosure provides a memory storage device, including: a connection interface unit, a rewritable non-volatile memory module, and a memory control circuit unit. The connection interface unit is coupled to the host system. The rewritable non-volatile memory module includes a plurality of physical erasing units, and each of the plurality of physical erasing units includes a plurality of physical programming units. The memory control circuit unit is coupled to the connection interface unit and the rewritable non-volatile memory module. The memory control circuit unit is configured for collecting a first valid data in a first source unit in the plurality of physical erasing units according to a first logical-to-physical address mapping table recorded in a candidate information, and determining whether a first data amount of the first valid data is the same as a second data amount of a valid data corresponding to a valid count of the first source unit; in response to determining that the first data amount is the same as the second data amount, the memory control circuit unit is further configured to copy the first valid data to a target unit in the plurality of physical erasing units, and in response to determining that the first data mount is not the same as the second data amount, the memory control circuit unit is further configured to obtain one or more second logical-to-physical address mapping tables according to a management information of the first source unit, and collect a second valid data in the first source unit according to the second logical-to-physical address mapping table, and copy the second valid data to the target unit. The management information records the logical-to-physical address mapping table corresponding to the valid data stored in each of the plurality of physical erasing units.

In an exemplary embodiment of the disclosure, the memory control circuit unit is further configured to set the candidate information, wherein the candidate information records the first logical-to-physical address mapping table.

In an exemplary embodiment of the disclosure, in the operation of setting the candidate information, the memory control circuit unit is further configured to select one or more of the plurality of physical erasing units as a second source unit according to the valid counts of the plurality of physical erasing units. The memory control circuit unit is further configured to obtain the second logical-to-physical address mapping table mapping the valid data of the second source unit according to the management information of the second source unit. Moreover, the memory control circuit unit is further configured to select one of the second logical-to-physical address mapping tables as the first logical-to-physical address mapping table to establish the candidate information.

In an exemplary embodiment of the disclosure, in the operation of selecting one of the second logical-to-physical address mapping tables as the first logical-to-physical address mapping table to establish the candidate information, the memory control circuit unit is further configured to calculate the count value of each of the second logical-to-physical address mapping tables according to the number of times the second logical-to-physical address mapping table is obtained. Moreover, the memory control circuit unit is further configured to select, according to the count value, one of the second logical-to-physical address mapping tables as the first logical-to-physical address mapping table to establish the candidate information.

In an exemplary embodiment of the disclosure, in the operation of setting the candidate information, the memory control circuit unit is further configured to preset the first logical-to-physical address mapping table recorded in the candidate information.

In an exemplary embodiment of the disclosure, the memory control circuit unit is further configured to update the candidate information according to the second logical-to-physical address mapping table recorded in the management information.

In an exemplary embodiment of the disclosure, in the operation of updating the candidate information according to the second logical-to-physical address mapping table recorded in the management information, the memory control circuit unit is further configured to recalculate the count value of each of the second logical-to-physical address mapping tables according to the number of times the second logical-to-physical address mapping table is obtained. Moreover, the memory control circuit unit is further configured to reselect the first logical-to-physical address mapping table from the second logical-to-physical address mapping table according to the count value to update the candidate information.

In an exemplary embodiment of the disclosure, the memory control circuit unit is further configured to obtain the valid counts of the plurality of physical erasing units, wherein the valid counts of the plurality of physical erasing units reflect the amount of valid data stored in each of the plurality of physical erasing units. Moreover, the memory control circuit unit is further configured to select one or more of the plurality of physical erasing units as the first source unit according to the valid counts of the plurality of physical erasing units.

An exemplary embodiment of the disclosure provides a memory control circuit unit for controlling a rewritable non-volatile memory module. The memory control circuit unit includes a host interface, a memory interface, and a memory management circuit. The host interface is coupled to a host system. The memory interface is coupled to the rewritable non-volatile memory module, wherein the rewritable non-volatile memory module includes a plurality of physical erasing units, and each of the plurality of physical erasing units includes a plurality of physical programming units. The memory management circuit is coupled to the host interface and the memory interface. The memory management circuit is configured for collecting a first valid data in a first source unit in the plurality of physical erasing units according to a first logical-to-physical address mapping table recorded in a candidate information, and determining whether a first data amount of the first valid data is the same as a second data amount of a valid data corresponding to a valid count of the first source unit. In response to determining that the first data amount is the same as the second data amount, the memory management circuit is further configured for copying the first valid data to a target unit in the plurality of physical erasing units; and in response to determining that the first data mount is not the same as the second data amount, the memory management circuit is further configured for obtaining one or more second logical-to-physical address mapping tables according to a management information of the first source unit, and collecting a second valid data in the first source unit according to the second logical-to-physical address mapping table, and copying the second valid data to the target unit. The management information records the logical-to-physical address mapping table corresponding to the valid data stored in each of the plurality of physical erasing units.

In an exemplary embodiment of the disclosure, the memory management circuit is further configured to set the candidate information, wherein the candidate information records the first logical-to-physical address mapping table.

In an exemplary embodiment of the disclosure, in the operation of setting the candidate information, the memory management circuit is further configured to select one or more of the plurality of physical erasing units as a second source unit according to the valid counts of the plurality of physical erasing units. The memory management circuit is further configured to obtain the second logical-to-physical address mapping table mapping the valid data of the second source unit according to the management information of the second source unit. Moreover, the memory management circuit is further configured to select one of the second logical-to-physical address mapping tables as the first logical-to-physical address mapping table to establish the candidate information.

In an exemplary embodiment of the disclosure, in the operation of selecting one of the second logical-to-physical address mapping tables as the first logical-to-physical address mapping table to establish the candidate information, the memory management circuit is further configured to calculate the count value of each of the second logical-to-physical address mapping tables according to the number of times the second logical-to-physical address mapping table is obtained. Moreover, the memory management circuit is further configured to select, according to the count value, one of the second logical-to-physical address mapping tables as the first logical-to-physical address mapping table to establish the candidate information.

In an exemplary embodiment of the disclosure, in the operation of setting the candidate information, the memory management circuit is further configured to preset the first logical-to-physical address mapping table recorded in the candidate information.

In an exemplary embodiment of the disclosure, the memory management circuit is further configured to update the candidate information according to the second logical-to-physical address mapping table recorded in the management information.

In an exemplary embodiment of the disclosure, in the operation of updating the candidate information according to the second logical-to-physical address mapping table recorded in the management information, the memory management circuit is further configured to recalculate the count value of each of the second logical-to-physical address mapping tables according to the number of times the second logical-to-physical address mapping table is obtained. Moreover, the memory management circuit is further configured to reselect the first logical-to-physical address mapping table from the second logical-to-physical address mapping table according to the count value to update the candidate information.

In an exemplary embodiment of the disclosure, the memory management circuit is further configured to obtain the valid counts of the plurality of physical erasing units, wherein the valid counts of the plurality of physical erasing units reflect the amount of valid data stored in each of the plurality of physical erasing units. Moreover, the memory management circuit is further configured to select one or more of the plurality of physical erasing units as the first source unit according to the valid counts of the plurality of physical erasing units.

Based on the above, based on the set candidate information, the memory storage device can collect the valid data of the physical erasing unit according to the logical-to-physical address mapping table recorded in the candidate information. When the valid data is the same as all the valid data amount stored in the physical erasing unit, the data belonging to this physical erasing unit will be copied to another physical erasing unit. In this way, based on the valid data merging method of the disclosure, the memory storage device can shorten the time to look up the logical-to-physical address mapping table mapped by the physical erasing unit when performing data merging operation, so as to reduce the time for collecting valid data.

In order to make the foregoing features and advantages of the disclosure more comprehensible, embodiments are described below in detail with the accompanying drawings as follows.

BRIEF DESCRIPTION OF THE DRAWINGS

FIG. 8 is a schematic diagram of usage information of a physical erasing unit according to an exemplary embodiment of the disclosure.

FIG. 9 is a schematic diagram of management information of a physical erasing unit according to an exemplary embodiment of the disclosure.

FIG. 10 is a schematic diagram of candidate information according to an exemplary embodiment of the disclosure.

FIG. 11 is a schematic diagram of management information of a physical erasing unit according to an exemplary embodiment of the disclosure.

DESCRIPTION OF THE EMBODIMENTS

Generally speaking, a memory storage device (also known as a memory storage system) includes a rewritable non-volatile memory module and a controller (also known as a control circuit unit). Typically, the memory storage device is used together with the host system, so that the host system can write data to the memory storage device or read data from the memory storage device.

Figure 1:
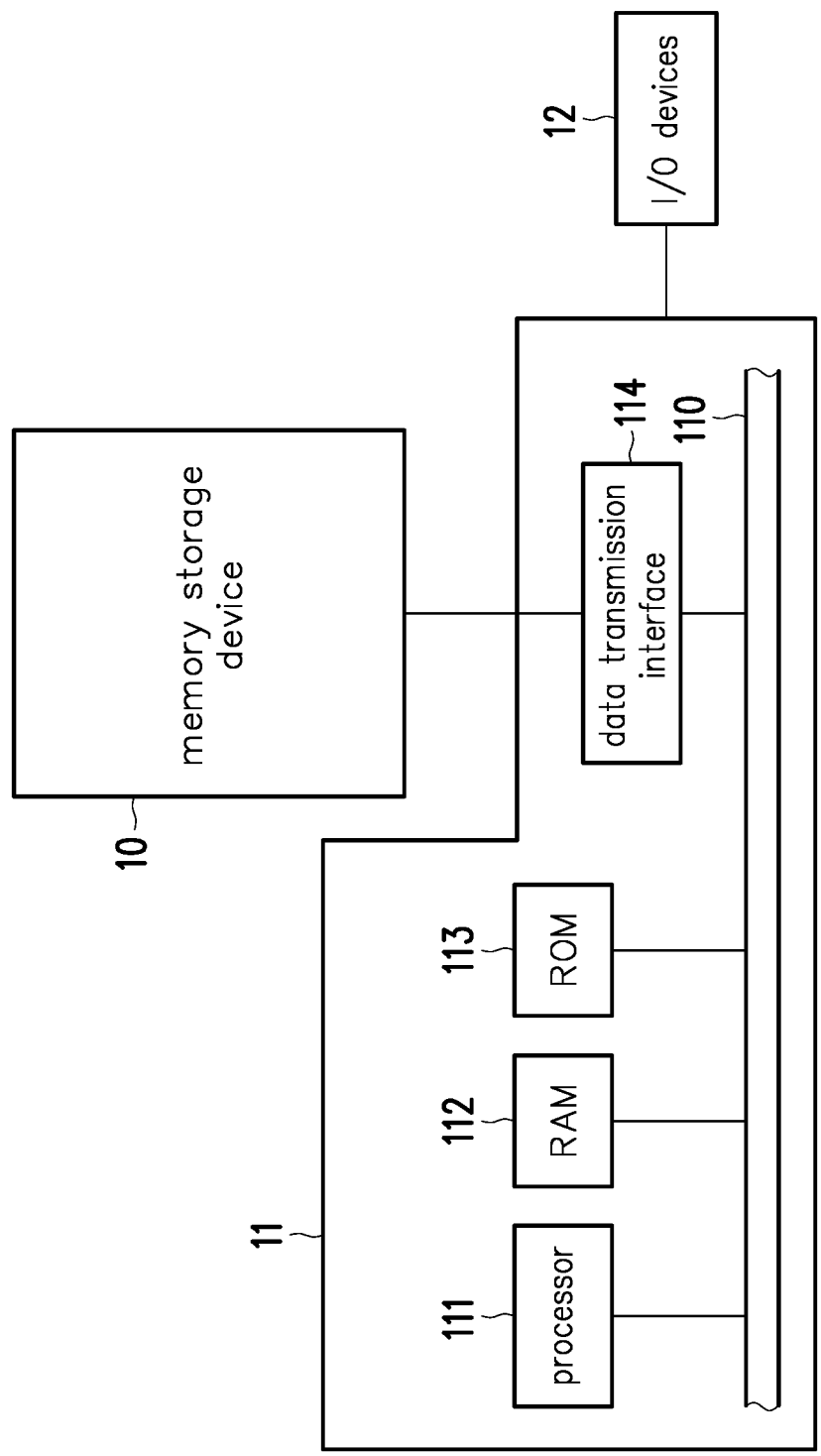
FIG. 1 is a schematic diagram of a host system, a memory storage device, and an input/output (I/O) device according to an exemplary embodiment.
Figure 2:
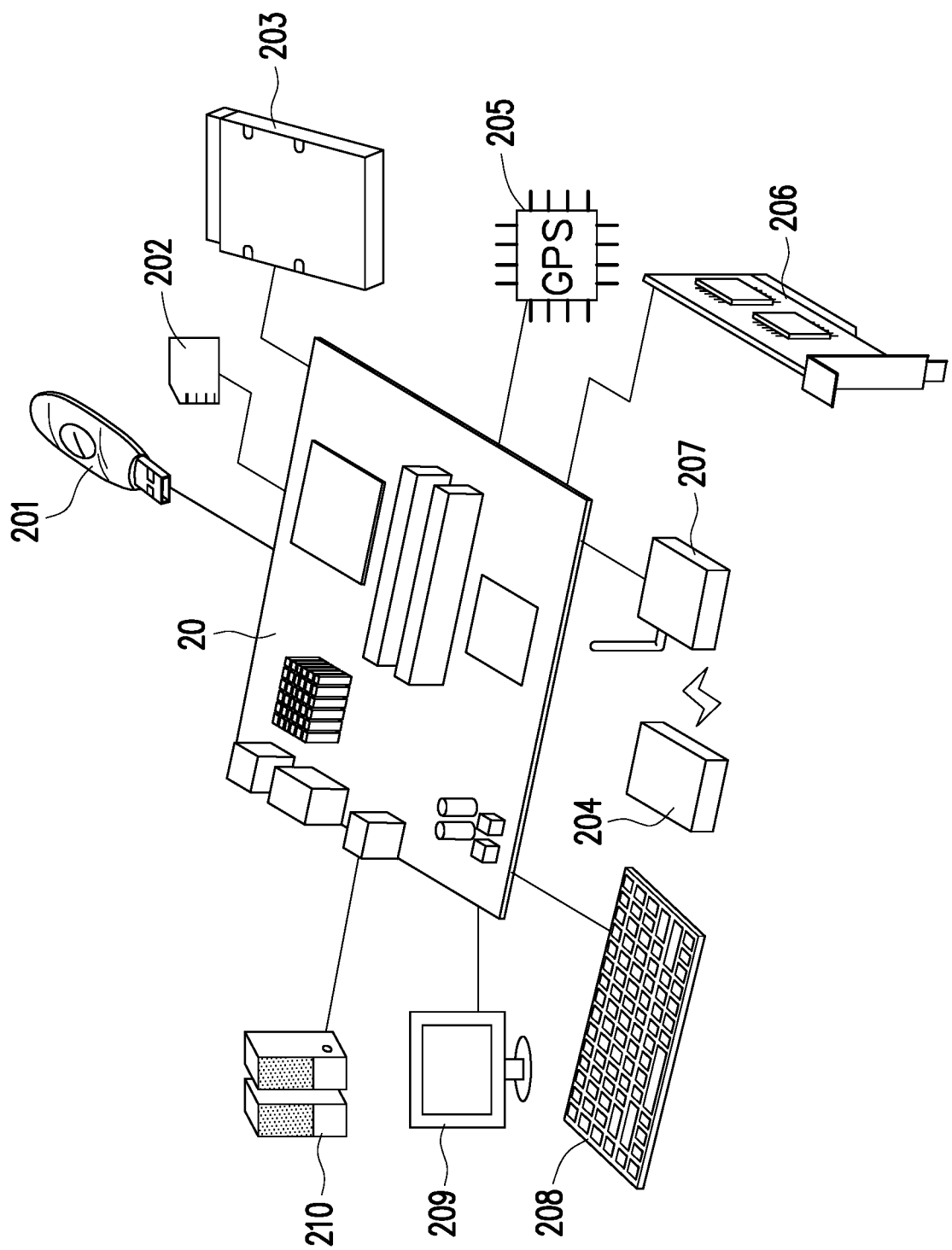
FIG. 2 is a schematic diagram of a host system, a memory storage device, and an input/output (I/O) device according to another exemplary embodiment.

FIG. 1 is a schematic diagram of a host system, a memory storage device, and an input/output (I/O) device according to an exemplary embodiment. FIG. 2 is a schematic diagram of a host system, a memory storage device, and an input/output (I/O) device according to another exemplary embodiment.

Please refer to FIG. 1 and FIG. 2, the host system 11 generally includes a processor 111, a random access memory (RAM) 112, a read only memory (ROM) 113 and a data transmission interface 114. The processor 111, the random access memory 112, the read-only memory 113, and the data transmission interface 114 are all coupled to a system bus 110.

In this exemplary embodiment, the host system 11 is coupled to the memory storage device 10 through the data transmission interface 114. For example, the host system 11 can write data to the memory storage device 10 or read data from the memory storage device 10 through the data transmission interface 114. In addition, the host system 11 is coupled to the I/O device 12 through the system bus 110. For example, the host system 11 can transmit output signals to the I/O device 12 or receive input signals from the I/O device 12 through the system bus 110.

In this exemplary embodiment, the processor 111, the random access memory 112, the read-only memory 113, and the data transmission interface 114 may be disposed on the motherboard 20 of the host system 11. The number of data transmission interfaces 114 may be one or more. Through the data transmission interface 114, the motherboard 20 can be coupled to the memory storage device 10 in a wired or wireless manner. The memory storage device 10 may be, for example, a flash drive 201, a memory card 202, a solid state drive (SSD) 203, or a wireless memory storage device 204. The wireless memory storage device 204 may be a memory storage device based on various wireless communication technologies such as a Near Field Communication Storage (NFC) memory storage device, a wireless fidelity (WiFi) memory storage device, a Bluetooth memory storage device, or a Bluetooth low energy storage device (for example, iBeacon). In addition, the motherboard 20 can also be coupled to a Global Positioning System (GPS) module 205, a network interface card 206, a wireless transmission device 207, a keyboard 208, a screen 209, a speaker 210, and various I/O devices through the system bus 110. For example, in an exemplary embodiment, the motherboard 20 can access the wireless memory storage device 204 through the wireless transmission device 207.

Figure 3:
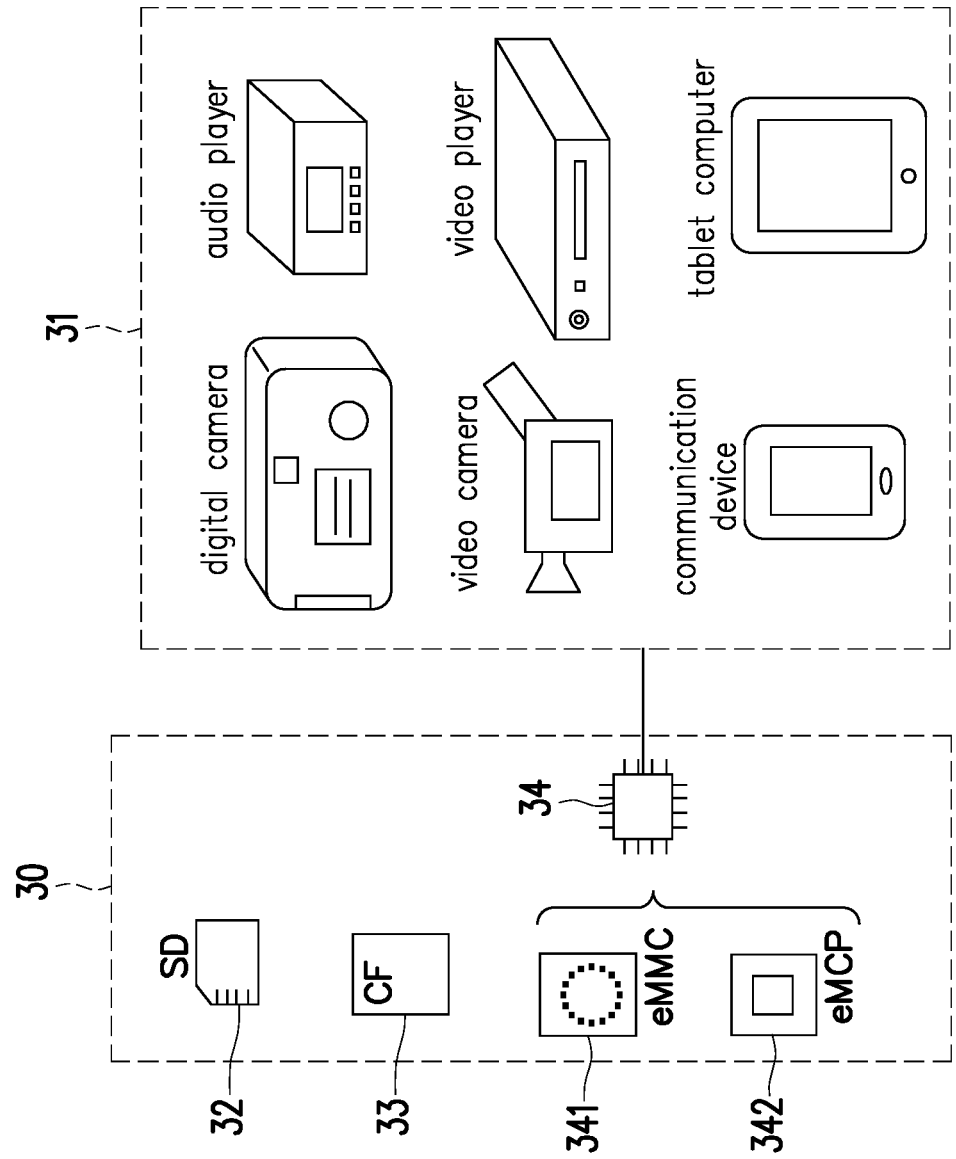
FIG. 3 is a schematic diagram illustrating a host system and a memory storage device according to another exemplary embodiment.

In an exemplary embodiment, the host system mentioned above is any system that can substantially cooperate with a memory storage device to store data. Although in the above exemplary embodiment, the host system is described as a computer system, FIG. 3 is a schematic diagram illustrating a host system and a memory storage device according to another exemplary embodiment. Referring to FIG. 3, in another exemplary embodiment, the host system 31 may also be a system such as a digital camera, a video camera, a communication device, an audio player, a video player, or a tablet computer, and the memory storage device 30 may be various non-volatile memory storage devices such as an SD card 32, a CF card 33, or an embedded storage device 34 adopted by the host system 31. The embedded storage device 34 includes an embedded MMC (eMMC) card 341 and/or an embedded Multi Chip Package (eMCP) storage device 342, and various types of embedded storage devices that directly couple the memory module to the substrate of the host system.

Figure 4:
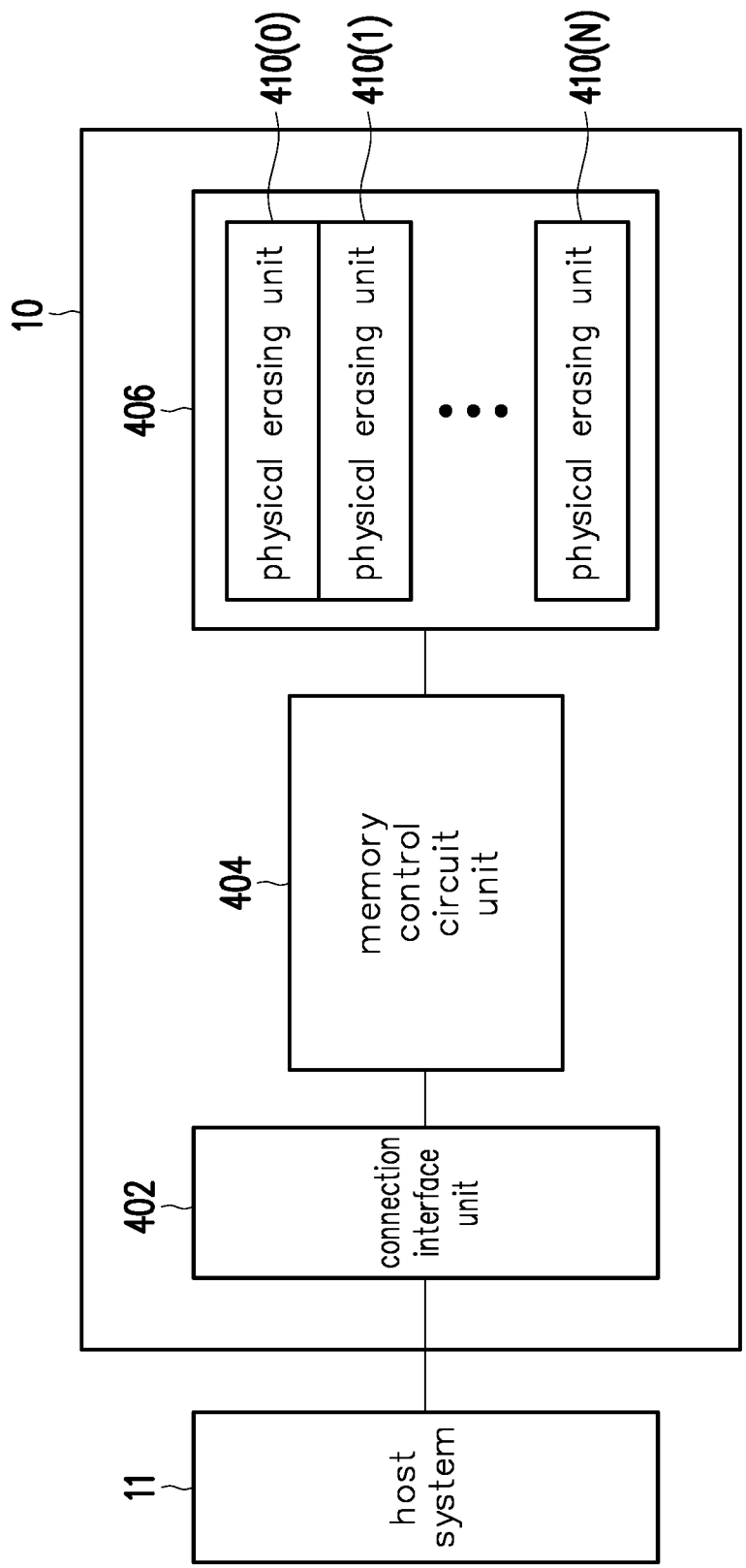
FIG. 4 is a schematic block diagram of a host system and a memory storage device according to an exemplary embodiment of the disclosure.

FIG. 4 is a schematic block diagram of a host system and a memory storage device according to an exemplary embodiment of the disclosure.

Referring to FIG. 4, the memory storage device 10 includes a connection interface unit 402, a memory control circuit unit 404, and a rewritable non-volatile memory module 406.

In this exemplary embodiment, the connection interface unit 402 is compatible with Secure Digital (SD) interface standard. However, it should be understood that the disclosure is not limited thereto, and the connection interface unit 402 may also conform to the Serial Advanced Technology Attachment (SATA) standard, Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, Ultra High Speed-I (UHS-I) interface standard, Ultra High Speed-II (UHS-II) interface standard, Memory Stick (MS) interface standard, Multi-Chip Package interface standard, Multimedia Card (MMC) interface standard, Embedded Multimedia Card (eMMC) interface standard, Universal Flash Storage (UFS) interface standard, embedded multi-chip package (eMCP) interface standard, Compact Flash (CF) interface standard, Integrated Device Electronics (IDE) standard or other suitable standards. In the exemplary embodiment, the connection interface unit 402 can be packaged in a chip with the memory control circuit unit 404, or the connection interface unit 402 can be arranged outside a chip containing the memory control circuit unit.

The memory control circuit unit 404 is configured to execute a plurality of logic gates or control commands implemented in the form of hardware or firmware, and perform data writing, data reading and data erasing operations in the rewritable non-volatile memory module 406 according to the commands of the host system 11.

The rewritable non-volatile memory module 406 is coupled to the memory control circuit unit 404 and is configured to store data written by the host system 11. The rewritable non-volatile memory module 406 has physical erasing units 410(0) to 410(N). For example, the physical erasing units 410(0) to 410(N) may belong to the same memory die or belong to different memory die. Each physical erasing unit respectively has a plurality of physical programming units, wherein the physical programming units belonging to the same physical erasing unit can be written independently and erased simultaneously. However, it should be understood that the disclosure is not limited thereto, and each physical erasing unit may be composed of 64 physical programming units, 256 physical programming units, or any number of physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundancy bit area. The data bit area having multiple physical access addresses is used to store user data, and the redundancy bit area is used to store system data (e.g., control information and error checking and correcting code). In the exemplary embodiment, each data bit area of the physical programming unit contains 8 physical access addresses, and the size of each physical access address is 512 byte. However, in other exemplary embodiments, the data bit area may also contain more or less physical access addresses, and the number and size of the physical access addresses are not limited by the disclosure. For example, in an exemplary embodiment, the physical erasing unit is a physical block, and the physical programming unit is a physical page or a physical sector, but the disclosure is not limited thereto.

In the exemplary embodiment, the rewritable non-volatile memory module 406 may be a SLC (Single Level Cell) NAND flash memory module (i.e., a flash memory module capable of storing one data bit in one memory cell). However, the disclosure is not limited thereto. The rewritable non-volatile memory module 406 may also be a MLC (Multi Level Cell) NAND flash memory module (i.e., a flash memory module capable of storing two data bits in one memory cell), a TLC (Trinary Level Cell) NAND flash memory module (i.e., a flash memory module capable of storing three data bits in one memory cell) or other memory modules having the same characteristics. Specifically, the memory cells arranged on the same word line can constitute one or more physical programming units. If each memory cell can store 2 bits or more, the physical programming units on the same word line can at least be classified into the lower physical programming unit and the upper physical programming unit. For example, the Least Significant Bit (LSB) of a memory cell belongs to the lower physical programming unit, and the Most Significant Bit (MSB) of a memory cell belongs to the upper physical programming unit. Generally speaking, in the MLC NAND flash memory, the writing speed of the lower physical programming unit is higher than that of the upper physical programming unit, and/or the reliability of the lower physical programming unit is higher than that of the upper physical programming unit.

In the rewritable non-volatile memory module 406, one or more bits are stored by changing a voltage (hereinafter, also referred to as a threshold voltage) of each of the memory cells. More specifically, in each of the memory cells, a charge trapping layer is provided between a control gate and a channel. The amount of electrons in the charge trapping layer may be changed by applying a write voltage to the control gate, thereby changing the threshold voltage of the memory cell. This operation of changing the threshold voltage of the memory cell is also referred to as "writing data into the memory cell" or "programming the memory cell". With the change in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

Figure 5:
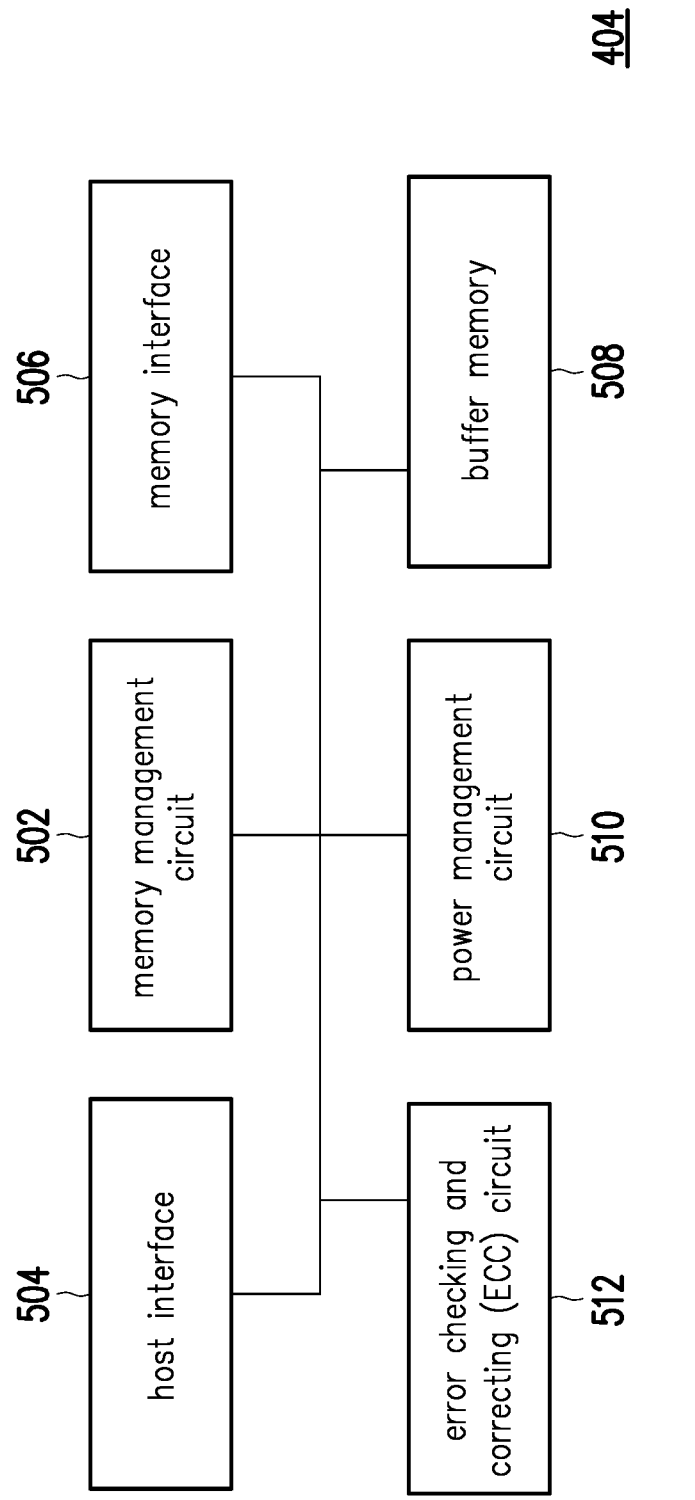
FIG. 5 is a schematic block diagram of a memory control circuit unit according to an exemplary embodiment of the disclosure.

FIG. 5 is a schematic block diagram of a memory control circuit unit according to an exemplary embodiment of the disclosure.

Please refer to FIG. 5, the memory control circuit unit 404 includes a memory management circuit 502, a host interface 504, and a memory interface 506.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. When the memory storage device 10 operates, the control commands are executed by the microprocessor unit to perform operations of writing, reading and erasing data.

In another exemplary embodiment, the control commands of the memory management circuit 502 may also be stored as program codes in a specific area (e.g., the system area in the memory module exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations of writing, reading and erasing data.

Further, in another exemplary embodiment, the control commands of the memory management circuit 502 may also be implemented in form of hardware. For example, the memory management circuit 502 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage the physical erasing unit of the rewritable non-volatile memory module 406. The memory writing circuit is configured to issue a write command to the rewritable non-volatile memory module 406 to write data into the rewritable non-volatile memory module 406. The memory reading circuit is configured to issue a read command to the rewritable non-volatile memory module 406 to read data from the rewritable non-volatile memory module 406. The memory erasing circuit is configured to issue an erase command to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406.

The host interface 504 is coupled to the memory management circuit 502 and is coupled to the connection interface unit 402 to receive and identify commands and data transmitted by the host system 11. In other words, the commands and data transmitted by the host system 11 will be transmitted to the memory management circuit 502 through the host interface 504. In the exemplary embodiment, the host interface 504 is compatible with the SATA standard. However, it should be understood that the disclosure is not limited thereto. The host interface 504 can also be compatible with the PATA standard, IEEE 1394 standard, PCI Express standard, USB standard, UHS-I interface standard, UHS-II interface standard, SD standard, MS standard, MMC standard, CF standard, IDE standard or other suitable data transmission standards.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 through the memory interface 506. Specifically, if the memory management circuit 502 is to access the rewritable non-volatile memory module 406, the memory interface 506 sends the corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). The command sequences are, for example, generated by the memory management circuit 502 and transmitted to the rewritable non-volatile memory module 406 through the memory interface 506. The command sequences may include one or more signals, or data on the bus. The signals or the data may include command codes or program codes. For example, information such as identification codes and memory addresses that are read are included in the read command sequence.

In an exemplary embodiment, the memory control circuit unit 404 further includes a buffer memory 508, a power management circuit 510, and an error checking and correcting (ECC) circuit 512.

The buffer memory 508 is coupled to the memory management circuit 502 and configured to temporarily store the data and commands from the host system 11 or the data from the rewritable non-volatile memory module 406. For example, the buffer memory 508 may include Dynamic Random Access Memory (DRAM) or Static Random Access Memory (SRAM), etc., which may lose stored data due to power failure or unstable voltage supply. In addition, the buffer memory 508 is implemented in the memory control circuit unit 404 in a chip set or system on chip (SoC), or is independent of the memory control circuit unit 404, the disclosure is not limited thereto. The power management circuit 510 is coupled to the memory management circuit 502 and configured to control the power of the memory storage device 10.

The ECC circuit 512 is coupled to the memory management circuit 502 and configured to perform an ECC procedure to ensure data accuracy. To be specific, when the memory management circuit 502 receives a writing command from the host system 11, the ECC circuit 512 generates an error checking and correcting (ECC) code for data corresponding to the writing command, and the memory management circuit 502 writes the data corresponding to the writing command and the corresponding ECC code into the rewritable non-volatile memory module 406. Subsequently, when the memory management circuit 502 reads the data from the rewritable non-volatile memory module 406, it also reads the ECC code corresponding to the data, and the ECC circuit 512 executes the ECC procedure on the data according to the ECC code.

Figure 6:
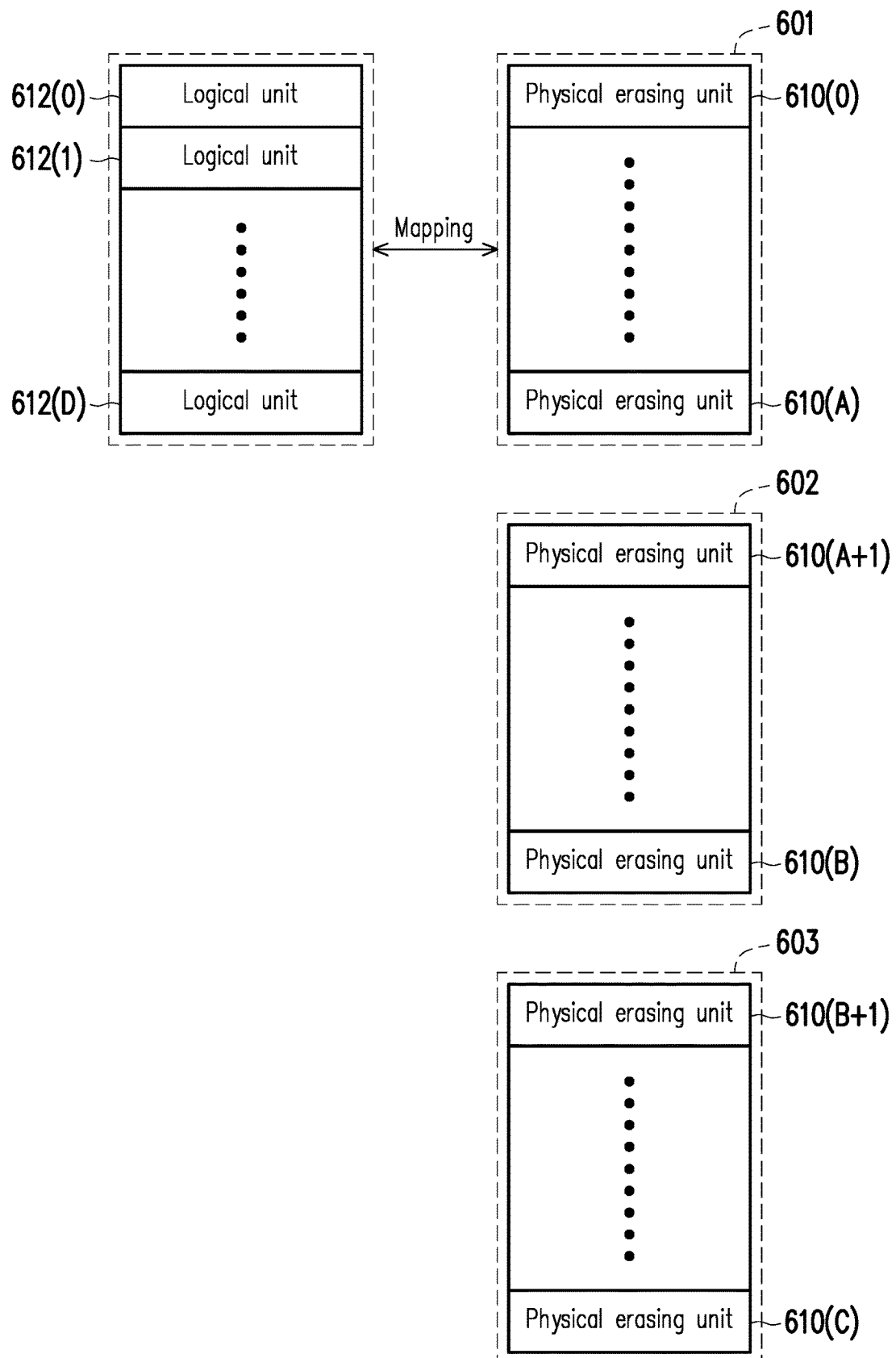
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Referring to FIG. 6, the memory management circuit 502 logically groups the memory cell of the rewritable non-volatile memory module 406 into physical erasing units 610(0)-610(C). It should be understood that terms, such as "select", "group" and so forth, are logical concepts which describe operations in the physical erasing units of the rewritable non-volatile memory module 406. That is, the physical erasing units of the rewritable non-volatile memory module 406 are logically operated, but actual positions of the physical erasing units of the rewritable non-volatile memory module 406 are not changed.

Referring to FIG. 6, the memory management circuit 502 logically groups the physical erasing units 610(0)-610(C) into a storage area 601, a spare area 602, and a system area 603. The physical erasing units 610(0) to 610(A) in the storage area 601 store data, while the physical erasing units 610(A+1) to 610(B) in the spare area 602 have not been used to store data. The physical erasing units 610(B+1)~610(C) in the system area 603 are configured to store system data, such as logical-to-physical address mapping table, bad block management table, device model or other types of management data.

During the operation of the memory storage device 10, the relationship between a certain physical erasing unit and the storage area 601 or the spare area 602 may change dynamically. For example, when receiving written data from the host system 11, the memory management circuit 502 will select a physical erasing unit from the spare area 602 to store at least a part of the written data and associate the physical erasing unit to the storage area 601. In addition, after erasing a certain physical erasing unit belonging to the storage area 601 to clear the data therein, the memory management circuit 502 associates the erased physical erasing unit to the spare area 602.

In the exemplary embodiment, the physical erasing unit belonging to the spare area 602 is also referred to as a spare physical erasing unit, and the physical erasing unit belonging to the storage area 601 can also be referred to as a non-spare physical erasing unit. Each physical erasing unit belonging to the spare area 602 is a physical erasing unit that is erased and does not store any data, and each physical erasing unit belonging to the storage area 601 stores data. Furthermore, each physical erasing unit belonging to the spare area 602 will not store any valid data, and each physical erasing unit belonging to the storage area 601 may store valid data and/or invalid data.

In an exemplary embodiment, the memory management circuit 502 configures logical units 612(0)~612(D) to map at least a part of the physical erasing units 610(0)~610(A) in the storage area 601. In this exemplary embodiment, the host system 11 accesses the data stored in the storage area 601 through a logical address (LA). Therefore, each of the logical units 612(0)~612(D) refers to a logical address, wherein each logical address has a plurality of sub-logical units to map the physical programming unit included in the physical erasing unit corresponding to the logical address. However, in another exemplary embodiment, each of the logical units 612(0) to 612(D) may also be composed of multiple consecutive (for example, consecutively numbered) logical addresses.

In an exemplary embodiment, in order to identify which physical erasing unit that the data of each logical address is stored in, the memory management circuit 502 will record the mapping relationship (also referred to as a logical-to-physical address mapping relationship) between the logical unit and the physical erasing unit in at least one logical-to-physical address mapping table. When the host system 11 is to read data from the memory storage device 10 or write data to the memory storage device 10, the memory management circuit 502 can access data from the memory storage device 10 according to the logical-to-physical address mapping table. For example, in the exemplary embodiment, the memory management circuit 502 stores the logical-to-physical address mapping table in the rewritable non-volatile memory module 406 to record the physical erasing unit mapped by each logical unit, and when data is to be accessed, the memory management circuit 502 loads the logical-to-physical address mapping table into the buffer memory 508 for maintenance. In an exemplary embodiment, the logical-to-physical address mapping table and specific usage data (for example, a management table that records management information of the memory storage device 10) are stored in other physical erasing units that do not belong to the storage area 601 and the spare area 602 to avoid being modified by the user.

It is worth mentioning that, due to the limited capacity of the buffer memory 508, the buffer memory 508 is unable to store a mapping table that records the mapping relationship between all logical units and physical erasing units. Therefore, in an exemplary embodiment, the memory management circuit 502 groups the sub-logical units into multiple logical units, and configures a logical-to-physical address mapping table for each logical unit. In another exemplary embodiment, the memory management circuit 502 may also group logical units into multiple logical areas, and configure a logical-to-physical address mapping table for each logical area. In particular, when the memory management circuit 502 wants to update the mapping of a certain sub-logical unit (or logical area), the logical-to-physical address mapping table corresponding to the logical unit (or logical area) to which this sub-logical unit (or logical area) belongs will be loaded into the buffer memory 508 to be updated.

In this exemplary embodiment, the valid data is the latest data belonging to a certain logical unit, and the invalid data is the old data not belonging to any logical unit. For example, if the host system 11 stores a new piece of data in a certain logical unit and overwrites the old data originally stored in the logical unit (that is, updates the data belonging to this logical unit), then the new piece of data stored in the storage area 601 is the latest data belonging to the logical unit and will be marked as valid, while the old data that is overwritten may still be stored in the storage area 601 but marked as invalid. In this exemplary embodiment, if the data belonging to a certain logical unit is updated, the mapping relationship between this logical unit and the physical erasing unit storing the old data belonging to this logical unit will be removed, and the mapping relationship between the logical unit and the physical erasing unit storing the latest data belonging to this logical unit will be established.

When performing a data writing operation, in addition to the written data from the host system 11, file system data is also involved. In some cases, for example, when the host system 11 continuously writes a large amount of data or overwrites data regionally, the written data may be rewritten within a certain period of time, but the frequency of file system data modification is usually low. In this case, the more frequently updated written data can be regarded as hot data, and the less frequently updated file system data can be regarded as cold data.

When written data and file system data are mixed and written to the same physical erasing unit in the rewritable non-volatile memory module, since the written data might be overwritten within a certain period of time subsequently, there is a small amount of valid data left in the physical erasing unit. When overwriting the written data, when the write command from the host system 11 instructs to write the written data into multiple logical sub-units belonging to different logical units, the memory management circuit 502 will sequentially write the data of the logical sub-units belonging to different logical units into the physical programming unit of the currently used physical erasing unit. In other words, after the operation is performed for a period of time, the data of consecutive logical sub-units belonging to the same logical unit might be written into different physical erasing units.

Figure 7A:
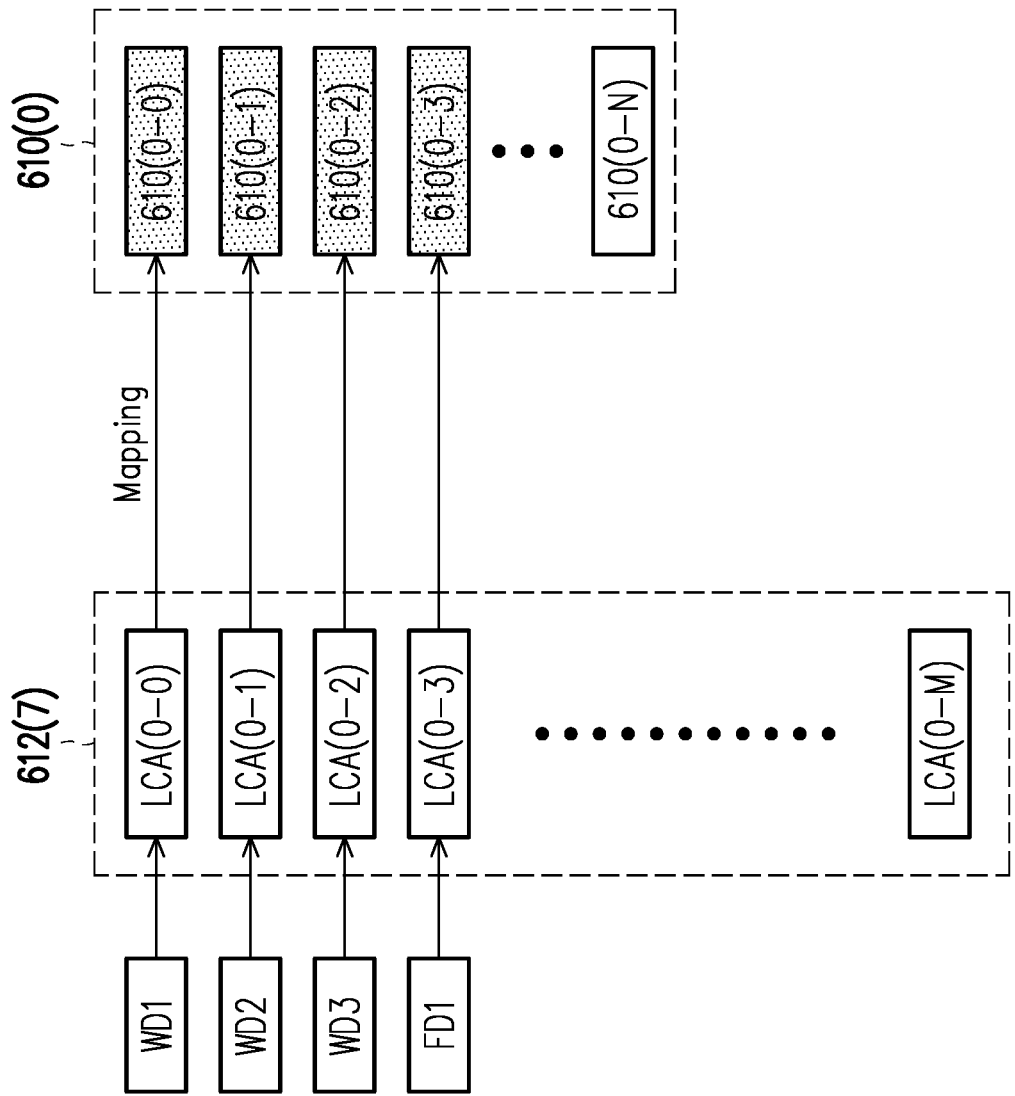
FIG. 7A to FIG. 7B are schematic diagrams of writing data based on physical programming units according to an exemplary embodiment of the disclosure.
Figure 7B:
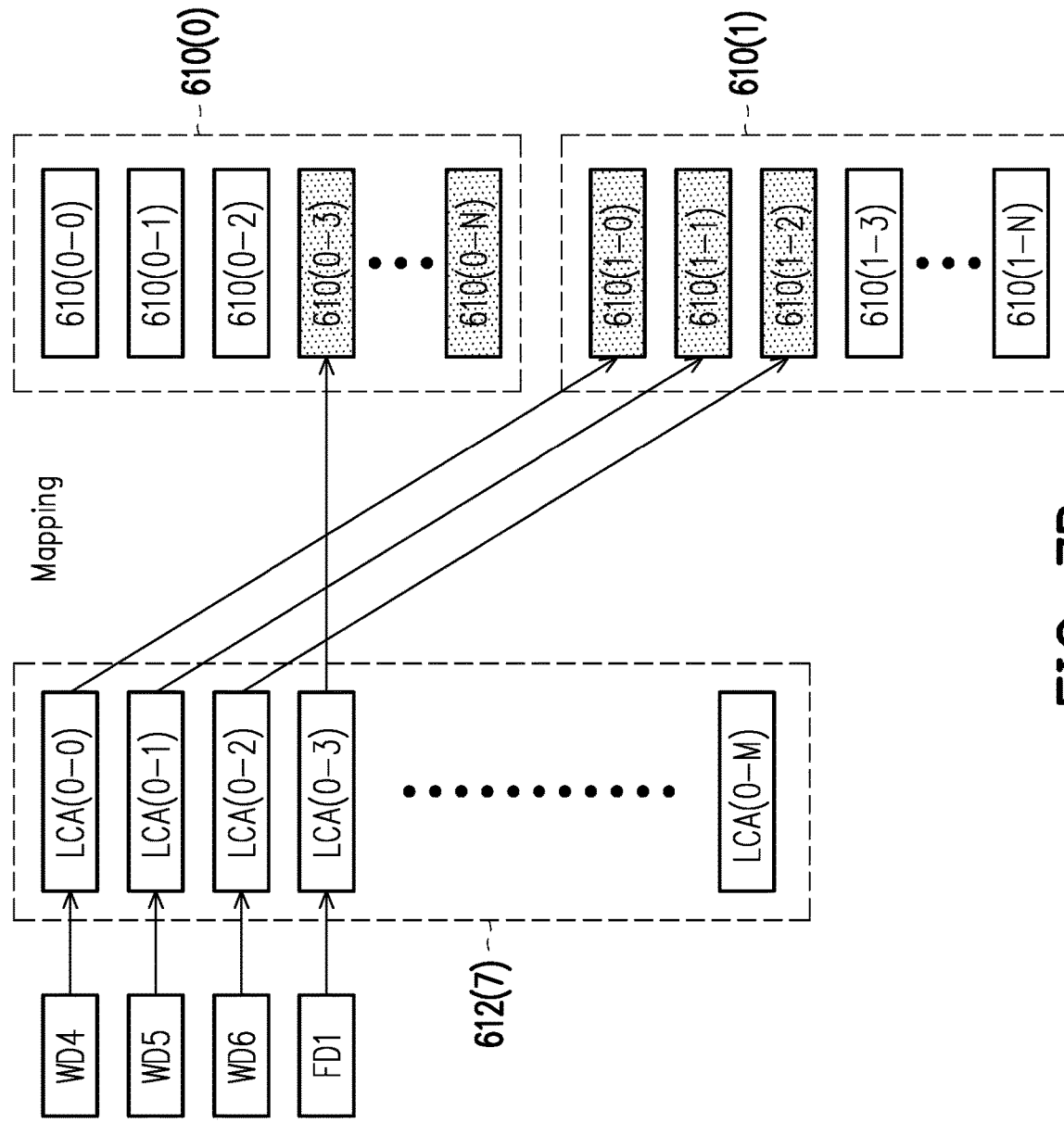

FIG. 7A to FIG. 7B are schematic diagrams of writing data based on physical programming units according to an exemplary embodiment of the disclosure.

Please refer to FIG. 7A, assuming that the logical unit 612(7) has sub-logical units LCA(0-0)~LCA(0-M), and the physical erasing unit 610(0) has a physical programming unit 610(0-0)~610(0-N), the values of M and N can be different according to the design of the rewritable non-volatile memory module 406, and the disclosure is not limited thereto. Suppose that the host system 11 sends one or more write commands to instruct to store the written data WD1 to the sub-logical unit LCA(0-0) of the logical unit 612(7), store the written data WD2 to the sub-logical unit LCA(0-1) of the logical unit 612(7), and store the written data WD3 to the sub-logical unit LCA(0-2) of the logical unit 612(7). And along with the written data WD1 to WD3, the memory management circuit 502 stores the file system data FD1 in the sub-logical unit LCA(0-3) of the logical unit 612(7) according to the write instruction. In response to the write command, the memory management circuit 502 extracts the physical erasing unit 610(0) from the spare area 602 as the currently used physical erasing unit, and writes the written data WD1, WD2, WD3, FD1 to the physical programming units 610(0-0)~610(0-3) of the physical erasing unit 610(0). The memory management circuit 502 also records related mapping information in the logical-to-physical address mapping table. For example, the logical sub-units LCA(0-0)~LCA(0-3) of the logical unit 612(7) are respectively mapped to the physical programming units 610(0-0)~610(0-3) of the physical erasing unit 610(0). It should be noted that the oblique shaded parts of the physical programming units 610(0-0)~610(0-3) in FIG. 7A are stored valid data.

After that, the memory management circuit 502 receives one or more write commands from the host system 11. Referring to FIG. 7B, suppose that the host system 11 sends one or more write commands to instruct to store the written data WD4 to the sub-logical unit LCA(0-0) of the logical unit 612(7), store the written data WD5 to the sub-logical unit LCA(0-1) of the logical unit 612(7), and store the written data WD6 to the sub-logical unit LCA(0-2) of the logical unit 612(7). Assuming that the physical erasing unit 610(0) is full, the memory management circuit 502 will extract the physical erasing unit 610(1) from the spare area 602 as the currently used physical erasing unit. The memory management circuit 502 writes the written data WD4, WD5, and WD6 into the physical programming units 610(1-0)~610(1-2) of the physical erasing unit 610(1) respectively according to the write command. In addition, the memory management circuit 502 also records related mapping information, for example, the logical sub-units LCA(0-0)~LCA(0-2) of the logical unit 612(7) are respectively mapped to the physical programming units 610(1-0)~610(1-2) of the physical erasing unit 610(1). It should be noted that the oblique shaded parts of the physical programming units 610(0-3), 610(0-N), 610(1-0)~610(1-2) in FIG. 7B are the stored valid data.

It can be seen from the above that after the operation is performed for a period of time, more frequently updated hot data (for example, written data) might be written into different physical erasing units. The mapping relationship between the logical unit to which the hot data is written and the physical erasing unit storing the old data of the hot data will be removed, and the old data of the hot data will become invalid data. In contrast, since the cold data (for example, file system data) is not frequently updated and stored in the original physical erasing unit, after multiple times of data overwriting, the remaining valid data of the physical erasing unit might only be cold data.

In this exemplary embodiment, the memory management circuit 502 also records usage information corresponding to each physical erasing unit. For example, the memory management circuit 502 can store the usage information in the system area 603. The usage information may include the valid count of the physical erasing unit, the number of reads, and the number of writes. The valid count can be used to indicate the number of physical programming units storing valid data in a physical erasing unit, that is, the valid count reflects the amount of valid data stored in a physical erasing unit. However, the usage information can also include more information, and is not limited to the content disclosed above. Taking FIG. 7 as an example, after receiving a write command, the memory management circuit 502 will perform the write operation of the physical programming unit 610(0-0) corresponding to the physical erasing unit 610(0). In addition, the memory management circuit 502 adds 1 to the valid count corresponding to the physical erasing unit 610(0). On the other hand, when the data of the physical programming unit 610(0-0) belonging to the physical erasing unit 610(0) is deleted or marked as invalid data, the memory management circuit 502 will minus 1 from the valid count corresponding to the physical erasing unit 610(0).

FIG. 8 is a schematic diagram of usage information of a physical erasing unit according to an exemplary embodiment of the disclosure. Referring to FIG. 8, the memory management circuit 502 uses a record table 810 to record the valid count information of each physical erasing unit. As shown in the record table 810, the valid count corresponding to the physical erasing unit 610(0) is 4, which means that the physical erasing unit 610(0) has 4 physical programming units that have stored valid data.

In this exemplary embodiment, the usage information may also include management information of each physical erasing unit. The management information records the logical-to-physical address mapping table corresponding to the valid data stored in each physical erasing unit. Taking FIG. 7A as an example, suppose that a logical-to-physical address mapping table PTE(7) is configured for the logical unit 612(7). After receiving the write command, the memory management circuit 502 stores the written data WD1 in the sub-logical unit LCA(0-0) of the logical unit 612(7) and performs the write operation of the physical programming unit 610(0-0) corresponding to the physical erasing unit 610(0). In addition, the memory management circuit 502 marks the identification information corresponding to the logical-to-physical address mapping table PTE(7) in the management information corresponding to the physical erasing unit 610(0) as bit "1", indicating that the valid data stored in the physical erasing unit 610(0) is mapped to the logical-to-physical address mapping table PTE(7). On the other hand, when the valid data stored in the physical erasing unit 610(0) is not mapped to the logical-to-physical address mapping table PTE(7), the memory management circuit 502 will mark the identification information of the logical-to-physical address mapping table PTE(7) as bit "0".

FIG. 9 is a schematic diagram of management information of a physical erasing unit according to an exemplary embodiment of the disclosure. Referring to FIG. 7A and FIG. 9, the memory management circuit 502 uses the record table 910 to record the management information of the physical erasing unit 610(0). As shown in the record table 910, the identification information of the logical-to-physical address mapping table PTE(7) is bit "1", indicating that the physical erasing unit 610(0) maps the data of the logical-to-physical address mapping table PTE(7), that is, the valid data stored in the physical erasing unit 610(0) is mapped to the logical-to-physical address mapping table PTE(7). On the other hand, the identification information of the logical-to-physical address mapping table PTE(0)~PTE(6) is bit "0", indicating that the physical erasing unit 610(0) does not map the data of the logical-to-physical address mapping tables PTE(0)~PTE(6), that is, the valid data stored in the physical erasing unit 610(0) is not mapped to the logical-to-physical address mapping tables PTE(0)~PTE(6).

During the operation of the memory storage device 10, the memory management circuit 502 can continuously update the total number of physical erasing units belonging to the spare area 602. The memory management circuit 502 can determine whether to perform a data merging operation according to the number of physical erasing units in the spare area 602. For example, the memory management circuit 502 can determine whether the total number of physical erasing units belonging to the spare area 602 is less than or equal to a threshold value. The first threshold value is, for example, a value of 2 or a greater value (for example, 10), which is not limited by the disclosure. If the total number of physical erasing units belonging to the spare area 602 is less than or equal to the threshold value, the memory management circuit 502 can perform a data merging operation. In an exemplary embodiment, the data merging operation is also referred to as a garbage collection (GC) operation.

In the garbage collection operation, the memory management circuit 502 will select the physical erasing unit for performing the garbage collection operation according to the usage information of the physical erasing unit. In addition, the memory management circuit 502 extracts at least one physical erasing unit from the spare area 602 as a target unit. The memory management circuit 502 can send at least one command sequence to instruct the rewritable non-volatile memory module 406 to copy valid data from the physical erasing unit as the source unit to the physical erasing unit as the target unit. If the valid data stored in a certain source unit has been copied to the target unit, the source unit can be erased and associated with the spare area 602. In an exemplary embodiment, the operation of reassociating a certain source unit from the storage area 601 back to the spare area 602 (or the operation of erasing a certain source unit) is also referred to as releasing a spare physical erasing unit. By performing the data merging operation, one or more spare physical erasing units will be released and the total number of physical erasing units belonging to the spare area 602 will gradually increase.

In an exemplary embodiment, the memory management circuit 502 obtains the valid count of the physical erasing unit based on the usage information corresponding to a physical erasing unit to determine the source unit. For example, the memory management circuit 502 can look up the record table 810 to obtain the valid count of the physical erasing unit, and select one or more of the physical erasing units as the source unit according to the valid count of the physical erasing unit. The memory management circuit 502 can sequentially select the physical erasing unit with the smallest valid count among the plurality of physical erasing units as the currently used source unit. It should be noted that the memory management circuit 502 provided by the disclosure can also use other parameters of the physical erasing unit and other methods to select other source units to be used, and the disclosure is not limited thereto.

In some cases, for the file system (for example, NTFS, FAT file system, etc. of Windows), when data is written, cold data (for example, file system data) might be concentrated in a range of certain logical addresses. Therefore, in this exemplary embodiment, the memory management circuit 502 can set candidate information to record a logical-to-physical address mapping table with a higher probability of storing cold data, and this logical-to-physical address mapping table maps a range of logical addresses. For example, the logical-to-physical address mapping table recorded by the candidate information can be preset at the factory. Or, after the memory storage device 10 operates for a period of time, the logical-to-physical address mapping table possibly corresponding to the cold data is learned to establish candidate information. The candidate information records at least one logical-to-physical address mapping table (also referred to as the first logical-to-physical address mapping table). For example, the memory management circuit 502 can store candidate information in the system area 603.

In this exemplary embodiment, the memory management circuit 502 may, for example, establish candidate information based on the acquired logical-to-physical address mapping table after performing one or more garbage collection operations. For example, after performing a garbage collection operation, the memory management circuit 502 can obtain one or more logical-to-physical address mapping tables (also referred to as the second logical-to-physical address mapping table) mapping the valid data of the source unit according to the management information of the source unit (also referred to as the second source unit), and select at least one of the second logical-to-physical address mapping tables as the first logical-to-physical address mapping table to establish candidate information. Alternatively, the memory management circuit 502 may determine at least one first logical-to-physical address mapping table to establish candidate information according to the number of times the second logical-to-physical address mapping table is acquired after performing multiple garbage collection operations. For example, the memory management circuit 502 may calculate the count value of each second logical-to-physical address mapping table according to the number of times the second logical-to-physical address mapping table is acquired, and select at least one of the second logical-to-physical address mapping tables according to the count value as the first logical-to-physical address mapping table to establish candidate information. For example, the second logical-to-physical address mapping table with the largest corresponding count value is selected as the first logical-to-physical address mapping table. It should be noted that the memory management circuit 502 provided by the disclosure can also use other parameters of the second logical-to-physical address mapping table and other methods to select the first logical-to-physical address mapping table, and the disclosure is not limited thereto.

FIG. 10 is a schematic diagram of candidate information according to an exemplary embodiment of the disclosure. Referring to FIG. 10, the memory management circuit 502 uses a record table 1010 to record candidate information. As shown in the record table 1010, the candidate information records a logical-to-physical address mapping table PTE(7).

After the memory management circuit 502 starts the garbage collection operation, it can be determined first whether the memory storage device 10 has candidate information. If it is determined that there is no candidate information, the memory management circuit 502 performs a general garbage collection operation. The specific operation details of the garbage collection operation are the same or similar to the foregoing garbage collection operation, so no further description is incorporated herein. The memory management circuit 502 can establish candidate information according to the acquired logical-to-physical address mapping table after performing a general garbage collection operation. The specific operation details are the same or similar to the aforementioned operation of establishing candidate information, so no further description is incorporated herein.

In this exemplary embodiment, if it is determined that there is candidate information, the memory management circuit 502 collects the valid data (also referred to as the first valid data) in the source unit (also referred to as the first source unit) in the physical erasing unit according to the first logical-to-physical address mapping table recorded by the candidate information, and determine whether the data amount of the first valid data (also referred to as the first data amount) is the same as the data amount of the valid data corresponding to the valid count of the first source unit (also referred to as the second data amount). In response to determining that the first data amount is the same as the second data amount, the memory management circuit 502 copies the first valid data in the source unit to the target unit. In response to determining that the first data amount is different from the second data amount, the memory management circuit 502 obtains one or more logical-to-physical address mapping tables (also referred to as second logical-to-physical address mapping tables) according to the management information of the first source unit. Then, the memory management circuit 502 collects the second valid data in the first source unit according to the acquired second logical-to-physical address mapping table, and copies the second valid data to the target unit.

Please refer to FIG. 9 and FIG. 10 at the same time. For example, suppose that when the garbage collection operation is performed, the management information of the first source unit is as shown in the record table 910 in FIG. 9. In this exemplary embodiment, the memory management circuit 502 collects the first valid data in the first source unit directly according to the logical-to-physical address mapping table PTE (7) recorded in the candidate information shown in FIG. 10, and determines the first data amount of the first valid data. Here, the first data amount will be the same as the second data amount of the valid data corresponding to the valid count of the first source unit (that is, the data amount collected according to the management information of the first source unit is the same). In other words, in this exemplary embodiment, the memory management circuit 502 uses the candidate information to successfully and directly select the logical-to-physical address mapping table that maps all valid data in the first source unit. Therefore, the memory management circuit 502 does not need to spend time looking up the record table 910 to find the logical-to-physical address mapping table mapped by the valid data stored in the first source unit.

FIG. 11 is a schematic diagram of management information of a physical erasing unit according to an exemplary embodiment of the disclosure. On the other hand, please refer to FIG. 10 and FIG. 11 at the same time. Suppose that when the garbage collection operation is performed, the management information of the first source unit is as shown in the record table 1110 in FIG. 11. In this exemplary embodiment, the memory management circuit 502 collects the first valid data in the first source unit directly according to the logical-to-physical address mapping table PTE (7) recorded in the candidate information shown in FIG. 10, and determines the first data amount of the first valid data. Here, it can be seen from the record table 1110 that the valid data of the first source unit is also mapped to other logical-to-physical address mapping tables PTE(0), PTE(1), and PTE (3)~PTE(6). Therefore, the first data amount is different from the second data amount of the valid data corresponding to the valid count of the first source unit (that is, the data amount collected based on the management information of the first source unit will be different). In other words, in this exemplary embodiment, the memory management circuit 502 uses the candidate information to not directly select the logical-to-physical address mapping table that maps all valid data in the first source unit. When determining that the first data amount is different from the second data amount, the memory management circuit 502 looks up the management information of the first source unit to obtain other logical-to-physical address mapping tables PTE(0), PTE(1), and PTE(3)~PTE(6), and use these logical-to-physical address mapping tables PTE(0), PTE(1), and PTE(3)~PTE(6) to collect the second valid data in the first source unit, and copy the second valid data to the target unit.

In this exemplary embodiment, after the valid data is copied to the target unit, the memory management circuit 502 can also update the candidate information according to the second logical-to-physical address mapping table recorded in the management information of the first source unit. For example, the memory management circuit 502 may recalculate the count value of each second logical-to-physical address mapping table according to the number of times the second logical-to-physical address mapping table is acquired. For example, referring to the management information in FIG. 11, the memory management circuit 502 can add 1 to the counter values corresponding to the second logical-to-physical address mapping table PTE(0), PTE(1), and PTE(3)~PTE(7). The disclosure is not limited thereto. In addition, the memory management circuit 502 re-selects the first logical-to-physical address mapping table from the second logical-to-physical address mapping table according to the recalculated count value to update the candidate information. For example, the second logical-to-physical address mapping table with the largest corresponding count value is selected as the first logical-to-physical address mapping table, which is not limited in the disclosure. It should be noted that the memory management circuit 502 provided by the disclosure can also use other parameters of the second logical-to-physical address mapping table and other methods to select the first logical-to-physical address mapping table, and the disclosure is not limited thereto.

By dynamically updating the first logical-to-physical address mapping table recorded by the candidate information, the cold data stored in the physical erasing unit can be mapped more accurately. Therefore, when the garbage collection operation is performed, there is a higher probability to directly use the first logical-to-physical address mapping table recorded in the candidate information to find all the valid data stored in the physical erasing unit.

It should be noted that the logical-to-physical address mapping table, usage information, candidate information, and count value information described in the above exemplary embodiment can be implemented as a lookup table or stored in other ways, and the disclosure provides no limitation thereto.

Figure 12:
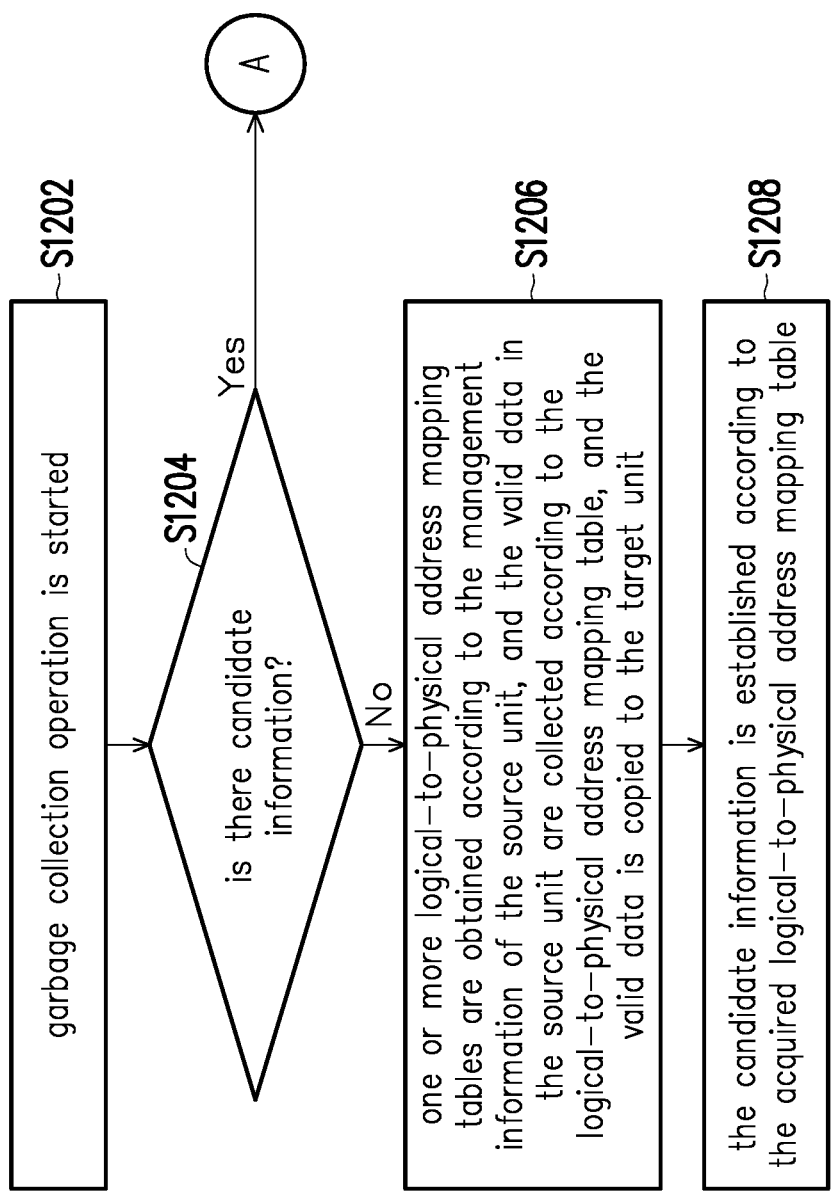
FIG. 12 is a flowchart of a valid data merging method according to an exemplary embodiment of the disclosure.

FIG. 12 is a flowchart of a valid data merging method according to an exemplary embodiment of the disclosure. Referring to FIG. 12, in step S1202, the garbage collection operation is started. In step S1204, it is determined whether there is candidate information. If it is determined that there is candidate information (step S1204, the determining result is YES), proceed to step S1304 in FIG. 13. If it is determined that there is no candidate information (step S1204, the determining result is No), then in step S1206, one or more logical-to-physical address mapping tables are obtained according to the management information of the source unit, and the valid data in the source unit are collected according to the logical-to-physical address mapping table. The valid data is copied to the target unit, and in step S1208, the candidate information is established according to the acquired logical-to-physical address mapping table.

Figure 13:
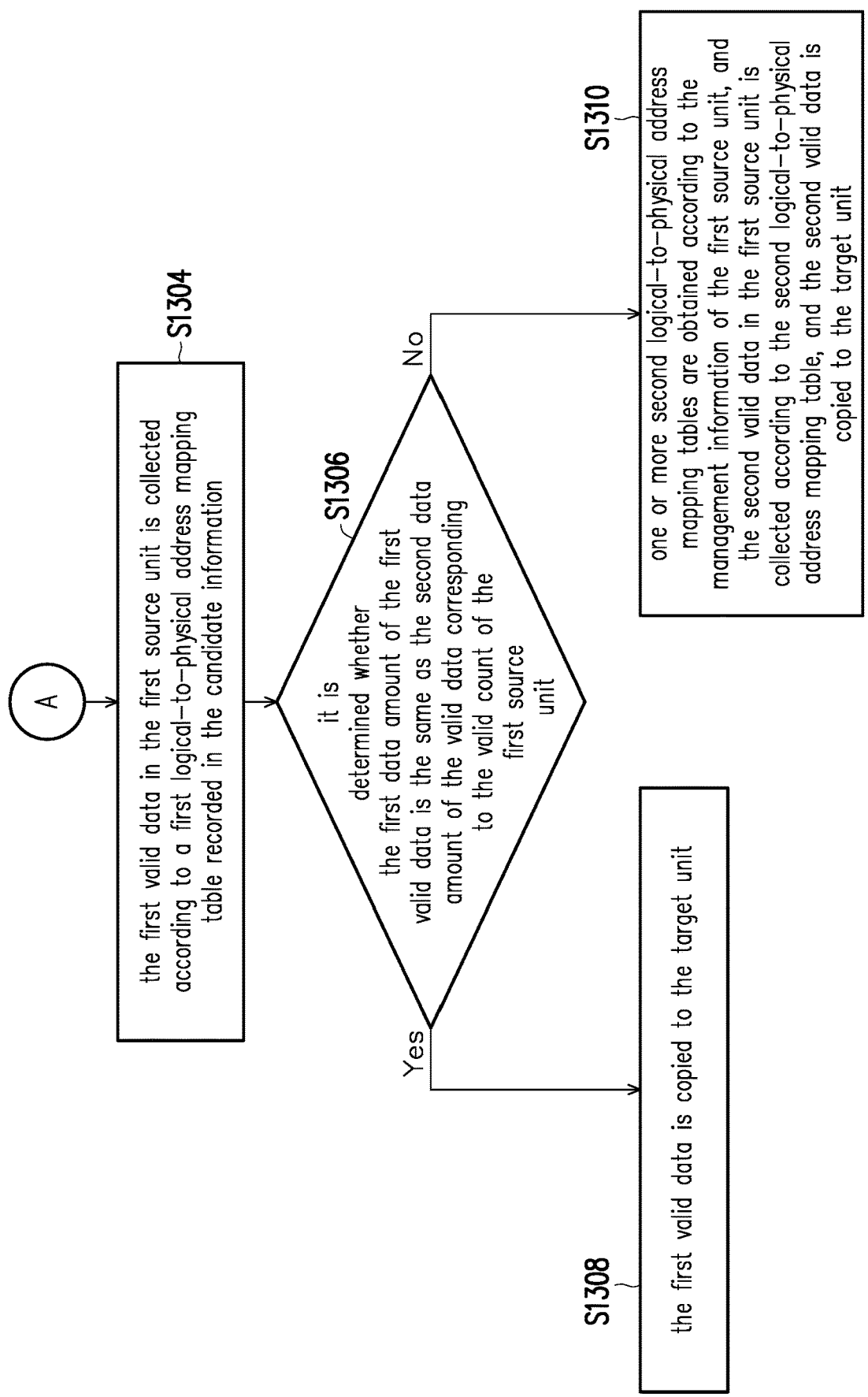
FIG. 13 is a flowchart of a valid data merging method according to an exemplary embodiment of the disclosure.

FIG. 13 is a flowchart of a valid data merging method according to an exemplary embodiment of the disclosure. Referring to FIG. 13, in step S1304, the first valid data in the first source unit is collected according to a first logical-to-physical address mapping table recorded in the candidate information. In step S1306, it is determined whether the first data amount of the first valid data is the same as the second data amount of the valid data corresponding to the valid count of the first source unit. If they are determined as the same (step S1306, the determining result is YES), then in step S1308, the first valid data is copied to the target unit. If they are determined as different (step S1306, the determining result is No), then in step S1310, one or more second logical-to-physical address mapping tables are obtained according to the management information of the first source unit, and the second valid data in the first source unit is collected according to the second logical-to-physical address mapping table, and the second valid data is copied to the target unit.

Figure 14:
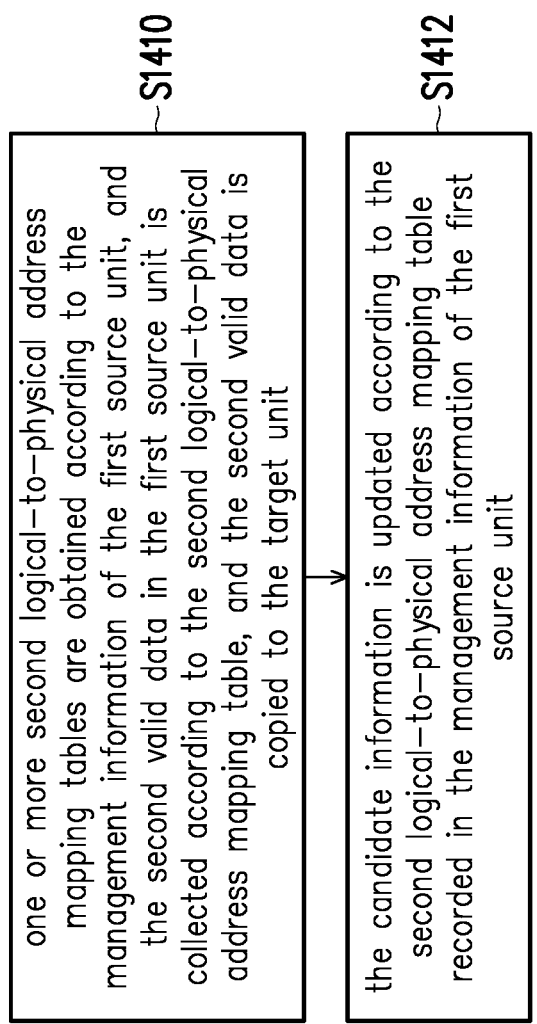
FIG. 14 is a flowchart of a valid data merging method according to an exemplary embodiment of the disclosure.

FIG. 14 is a flowchart of a valid data merging method according to an exemplary embodiment of the disclosure. Referring to FIG. 14, in step S1410, one or more second logical-to-physical address mapping tables are obtained according to the management information of the first source unit, and the second valid data in the first source unit is collected according to the second logical-to-physical address mapping table, and the second valid data is copied to the target unit. In step S1412, the candidate information is updated according to the second logical-to-physical address mapping table recorded in the management information of the first source unit.

However, the steps in FIG. 12, FIG. 13 and FIG. 14 have been described in detail as above, and no further description is incorporated herein. It should be noted that the steps in FIG. 12, FIG. 13 and FIG. 14 can be implemented as multiple program codes or circuits, and the disclosure provides no limitation thereto. In addition, the methods in FIG. 12, FIG. 13 and FIG. 14 can be used in conjunction with the above exemplary embodiments, or can be used alone, and the disclosure provides no limitation thereto.

In summary, the valid data merging method, memory storage device, and memory control circuit unit in the exemplary embodiment of the disclosure can first collect the valid data of the logical-to-physical address mapping table mapped by the physical erasing unit according to the logicalto-physical address mapping table recorded in the set candidate information. When the collected valid data is the same as the amount of valid data stored in the physical erasing unit, the data belonging to the physical erasing unit is copied to one physical erasing unit. In this way, according to the valid data merging method of the disclosure, the memory storage device can shorten the time for looking up the logical-to-physical address mapping table mapped by the physical erasing unit when performing data merging operations, thereby reducing the time for collecting valid data.

Although the disclosure has been disclosed as above by way of embodiments, it is not intended to limit the disclosure. Any person with ordinary knowledge in the technical field can make some changes and decorations without departing from the spirit and scope of the disclosure, so the protection scope of the disclosure shall be determined by the scope of the attached patent application.

What is claimed is:

1. A valid data merging method for a rewritable non-volatile memory module, the rewritable non-volatile memory module comprising a plurality of physical erasing units, and each of the plurality of physical erasing units comprising a plurality of physical programming units, the valid data merging method comprising:
    collecting a first valid data in a first source unit in the plurality of physical erasing units according to a first logical-to-physical address mapping table recorded in a candidate information, and determining whether a first data amount of the first valid data is the same as a second data amount of a valid data corresponding to a valid count of the first source unit;
    in response to determining that the first data amount is the same as the second data amount, copying the first valid data to a target unit in the plurality of physical erasing units; and
    in response to determining that the first data amount is not the same as the second data amount, obtaining one or more second logical-to-physical address mapping tables according to a management information of the first source unit, and collecting a second valid data in the first source unit according to the second logical-to-physical address mapping table, and copying the second valid data to the target unit,
    wherein the management information records a logical-to-physical address mapping table corresponding to a valid data stored in each of the plurality of physical erasing units.

2. The valid data merging method according to claim 1, wherein the method further comprises:
    setting the candidate information, wherein the candidate information records the first logical-to-physical address mapping table.

3. The valid data merging method according to claim 2, wherein the step of setting the candidate information comprises:
    selecting one or more of the plurality of physical erasing units according to valid counts of the plurality of physical erasing units as a second source unit;
    obtaining the second logical-to-physical address mapping table mapping a valid data of the second source unit according to a management information of the second source unit; and
    selecting one of the second logical-to-physical address mapping tables as the first logical-to-physical address mapping table to establish the candidate information.

4. The valid data merging method according to claim 3, wherein the step of selecting one of the second logical-to-physical address mapping tables as the first logical-to-physical address mapping table to establish the candidate information comprises:
    calculating a count value of each of the second logical-to-physical address mapping tables according to the number of times the second logical-to-physical address mapping table is obtained; and
    selecting, according to the count value, one of the second logical-to-physical address mapping tables as the first logical-to-physical address mapping table to establish the candidate information.

5. The valid data merging method according to claim 2, wherein the step of setting the candidate information comprises:
    presetting the first logical-to-physical address mapping table recorded in the candidate information.

6. The valid data merging method according to claim 1, wherein after copying the second valid data to the target unit, the valid data merging method further comprises:
    updating the candidate information according to the second logical-to-physical address mapping table recorded in the management information.

7. The valid data merging method according to claim 6, wherein the step of updating the candidate information according to the second logical-to-physical address mapping table recorded in the management information comprises:
    recalculating a count value of each of the second logical-to-physical address mapping tables according to the number of times the second logical-to-physical address mapping table is obtained; and
    reselecting the first logical-to-physical address mapping table from the second logical-to-physical address mapping table according to the count value to update the candidate information.

8. The valid data merging method according to claim 1, wherein the method further comprises:
    obtaining valid counts of the plurality of physical erasing units, wherein the valid counts of the plurality of physical erasing units reflect the amount of valid data stored in each of the plurality of physical erasing units; and
    selecting one or more of the plurality of physical erasing units as the first source unit according to the valid counts of the plurality of physical erasing units.

9. A memory storage device, comprising:
    a connection interface unit, coupled to a host system;
    a rewritable non-volatile memory module, comprising a plurality of physical erasing units, each of the plurality of physical erasing units comprising a plurality of physical programming units; and
    a memory control circuit unit, coupled to the connection interface unit and the rewritable non-volatile memory module,
    wherein the memory control circuit unit is configured for collecting a first valid data in a first source unit in the plurality of physical erasing units according to a first logical-to-physical address mapping table recorded in a candidate information, and determining whether a first data amount of the first valid data is the same as a second data amount of a valid data corresponding to a valid count of the first source unit;
    in response to determining that the first data amount is the same as the second data amount, the memory control circuit unit is further configured to copy the first valid data to a target unit in the plurality of physical erasing units, and in response to determining that the first data amount is not the same as the second data amount, the memory control circuit unit is further configured to obtain one or more second logical-to-physical address mapping tables according to a management information of the first source unit, and collect a second valid data in the first source unit according to the second logical-to-physical address mapping table, and copy the second valid data to the target unit, wherein the management information records a logical-to-physical address mapping table corresponding to a valid data stored in each of the plurality of physical erasing units.

10. The memory storage device according to claim 9, wherein the memory control circuit unit is further configured to set the candidate information, wherein the candidate information records the first logical-to-physical address mapping table.

11. The memory storage device according to claim 10, wherein in the operation of setting the candidate information, the memory control circuit unit is further configured to select one or more of the plurality of physical erasing units as a second source unit according to valid counts of the plurality of physical erasing units, the memory control circuit unit is further configured to obtain the second logical-to-physical address mapping table mapping a valid data of the second source unit according to a management information of the second source unit, and the memory control circuit unit is further configured to select one of the second logical-to-physical address mapping tables as the first logical-to-physical address mapping table to establish the candidate information.

12. The memory storage device according to claim 11, wherein in the operation of selecting one of the second logical-to-physical address mapping tables as the first logical-to-physical address mapping table to establish the candidate information, the memory control circuit unit is further configured to calculate a count value of each of the second logical-to-physical address mapping tables according to the number of times the second logical-to-physical address mapping table is obtained, and the memory control circuit unit is further configured to select, according to the count value, one of the second logical-to-physical address mapping tables as the first logical-to-physical address mapping table to establish the candidate information.

13. The memory storage device according to claim 10, wherein in the operation of setting the candidate information, the memory control circuit unit is further configured to preset the first logical-to-physical address mapping table recorded in the candidate information.

14. The memory storage device according to claim 9, wherein the memory control circuit unit is further configured to update the candidate information according to the second logical-to-physical address mapping table recorded in the management information.

15. The memory storage device according to claim 14, wherein in the operation of updating the candidate information according to the second logical-to-physical address mapping table recorded in the management information, the memory control circuit unit is further configured to recalculate a count value of each of the second logical-to-physical address mapping tables according to the number of times the second logical-to-physical address mapping table is obtained, and the memory control circuit unit is further configured to reselect the first logical-to-physical address mapping table from the second logical-to-physical address mapping table according to the count value to update the candidate information.

16. The memory storage device according to claim 9, wherein the memory control circuit unit is further configured to obtain valid counts of the plurality of physical erasing units, wherein the valid counts of the plurality of physical erasing units reflect the amount of valid data stored in each of the plurality of physical erasing units, and the memory control circuit unit is further configured to select one or more of the plurality of physical erasing units as the first source unit according to the valid counts of the plurality of physical erasing units.

17. A memory control circuit unit, configured to control a rewritable non-volatile memory module, comprising:

a host interface, coupled to a host system;

a memory interface, coupled to the rewritable non-volatile memory module, wherein the rewritable non-volatile memory module comprises a plurality of physical erasing units, and each of the plurality of physical erasing units comprises a plurality of physical programming units; and a memory management circuit, coupled to the host interface and the memory interface, wherein the memory management circuit is configured for collecting a first valid data in a first source unit in the plurality of physical erasing units according to a first logical-to-physical address mapping table recorded in a candidate information, and determining whether a first data amount of the first valid data is the same as a second data amount of a valid data corresponding to a valid count of the first source unit, in response to determining that the first data amount is the same as the second data amount, the memory management circuit is further configured for copying the first valid data to a target unit in the plurality of physical erasing units; and in response to determining that the first data amount is not the same as the second data amount, the memory management circuit is further configured for obtaining one or more second logical-to-physical address mapping tables according to a management information of the first source unit, and collecting a second valid data in the first source unit according to the second logical-to-physical address mapping table, and copying the second valid data to the target unit, wherein the management information records a logical-to-physical address mapping table corresponding to a valid data stored in each of the plurality of physical erasing units.

18. The memory control circuit unit according to claim 17, wherein the memory management circuit is further configured to set the candidate information, wherein the candidate information records the first logical-to-physical address mapping table.

19. The memory control circuit unit according to claim 18, wherein in the operation of setting the candidate information, the memory management circuit is further configured to select one or more of the plurality of physical erasing units as a second source unit according to valid counts of the plurality of physical erasing units, the memory management circuit is further configured to obtain the second logical-to-physical address mapping table mapping a valid data of the second source unit according to a management information of the second source unit, and the memory management circuit is further configured to select one of the second logical-to-physical address mapping tables as the first logical-to-physical address mapping table to establish the candidate information.

20. The memory control circuit unit according to claim 19, wherein in the operation of selecting one of the second logical-to-physical address mapping tables as the first logical-to-physical address mapping table to establish the candidate information, the memory management circuit is further configured to calculate a count value of each of the second logical-to-physical address mapping tables according to the number of times the second logical-to-physical address mapping table is obtained, and the memory management circuit is further configured to select, according to the count value, one of the second logical-to-physical address mapping tables as the first logical-to-physical address mapping table to establish the candidate information.

21. The memory control circuit unit according to claim 18, wherein in the operation of setting the candidate information, the memory management circuit is further configured to preset the first logical-to-physical address mapping table recorded in the candidate information.

22. The memory control circuit unit according to claim 17, wherein the memory management circuit is further configured to update the candidate information according to the second logical-to-physical address mapping table recorded in the management information.

23. The memory control circuit unit according to claim 22, wherein in the operation of updating the candidate information according to the second logical-to-physical address mapping table recorded in the management information, the memory management circuit is further configured to recalculate a count value of each of the second logical-to-physical address mapping tables according to the number of times the second logical-to-physical address mapping table is obtained, and the memory management circuit is further configured to reselect the first logical-to-physical address mapping table from the second logical-to-physical address mapping table according to the count value to update the candidate information.

24. The memory control circuit unit according to claim 17, wherein the memory management circuit is further configured to obtain valid counts of the plurality of physical erasing units, wherein the valid counts of the plurality of physical erasing units reflect the amount of valid data stored in each of the plurality of physical erasing units, and the memory management circuit is further configured to select one or more of the plurality of physical erasing units as the first source unit according to the valid counts of the plurality of physical erasing units.

* * * * *